US012248672B2

(12) United States Patent
Yang et al.

(10) Patent No.: US 12,248,672 B2
(45) Date of Patent: Mar. 11, 2025

(54) PROGRESS ADJUSTMENT METHOD AND APPARATUS, ELECTRONIC DEVICE AND STORAGE MEDIUM

(71) Applicant: Beijing Zitiao Network Technology Co., Ltd., Beijing (CN)

(72) Inventors: Yazhen Yang, Beijing (CN); Sen Wang, Beijing (CN); Wentao Ruan, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/399,326

(22) Filed: Dec. 28, 2023

(65) Prior Publication Data

US 2024/0126422 A1    Apr. 18, 2024

Related U.S. Application Data

(63) Continuation of application No. PCT/CN2022/110499, filed on Aug. 5, 2022.

(30) Foreign Application Priority Data

Aug. 18, 2021   (CN) .......................... 202110950552.9

(51) Int. Cl.
  *G06F 3/04847*    (2022.01)
  *H04N 21/472*    (2011.01)
(52) U.S. Cl.
  CPC ... *G06F 3/04847* (2013.01); *H04N 21/47217* (2013.01)

(58) Field of Classification Search
  CPC .................................................. G06F 3/04847
  (Continued)

(56) References Cited

U.S. PATENT DOCUMENTS

| 11,868,676 B2 * | 1/2024 | Boyd ...................... G06F 3/165 |
| 2008/0178116 A1 | 7/2008 | Kim |

(Continued)

FOREIGN PATENT DOCUMENTS

| CN | 103581758 A | 2/2014 |
| CN | 103927107 A | 7/2014 |

(Continued)

OTHER PUBLICATIONS

International Patent Application No. PCT/CN2022/110499; Int'l Written Opinion and Search Report; dated Nov. 3, 2022; 4 pages.

(Continued)

*Primary Examiner* — Ruay Ho
(74) *Attorney, Agent, or Firm* — BakerHostetler (57) ABSTRACT

Embodiments of the present disclosure provide a progress adjustment method and apparatus, an electronic device and a storage medium. The method comprises: receiving a progress adjustment operation that acts on a progress bar of a target content; in response to the progress adjustment operation, expanding a size of the progress bar, and adjusting the progress of the target content according to the progress adjustment operation; and in response to determining that the progress adjustment operation ends, stopping adjusting, according to the progress adjustment operation, the progress of the target content.

17 Claims, 5 Drawing Sheets

(58) Field of Classification Search
USPC .................................................. 715/772, 716
See application file for complete search history.

(56) References Cited

U.S. PATENT DOCUMENTS

| | | | |
|---|---|---|---|
| 2013/0298021 | A1 | 11/2013 | Park et al. |
| 2014/0201633 | A1* | 7/2014 | Jiao ...................... G06F 3/0488 |
| | | | 715/716 |
| 2015/0370402 | A1 | 12/2015 | Checkley et al. |
| 2015/0370470 | A1 | 12/2015 | Liu |
| 2016/0170581 | A1 | 6/2016 | Wang et al. |
| 2017/0168705 | A1 | 6/2017 | Li |
| 2020/0364027 | A1 | 11/2020 | Song |
| 2023/0136808 | A1 | 5/2023 | Yuan et al. |
| 2024/0094983 | A1* | 3/2024 | Boyd ...................... G06F 3/165 |

FOREIGN PATENT DOCUMENTS

| | | | |
|---|---|---|---|
| CN | 104123079 | A | 10/2014 |
| CN | 105898593 | A | 8/2016 |
| CN | 105975178 | A | 9/2016 |
| CN | 106325668 | A | 1/2017 |
| CN | 106775315 | A | 5/2017 |
| CN | 106775379 | A | 5/2017 |
| CN | 107704241 | A | 2/2018 |
| CN | 108920060 | A | 11/2018 |
| CN | 109254691 | A | 1/2019 |
| CN | 109445671 | A | 3/2019 |
| CN | 110837333 | A | 2/2020 |
| CN | 111708479 | A | 9/2020 |
| CN | 112631475 | A | 4/2021 |
| CN | 113110783 | A | 7/2021 |
| CN | 113608816 | A | 11/2021 |
| CN | 113906419 | A * | 1/2022 ........... G06F 1/1626 |
| JP | 2004-192573 | A | 7/2004 |

OTHER PUBLICATIONS

European Patent Application No. 22857614.6; Supplementary Search Report; dated Oct. 24, 2024; 10 pages.
Japan Patent Application No. 2024-509462; Notice of Reasons for Refusal; dated Jan. 16, 2015; 11 pages.

* cited by examiner

PROGRESS ADJUSTMENT METHOD AND APPARATUS, ELECTRONIC DEVICE AND STORAGE MEDIUM

The present application is a continuation of International Application No. PCT/CN2022/110499 filed on Aug. 5, 2022, which claims the priority to the Chinese Patent Application No. 202110950552.9 filed on Aug. 18, 2021, and entitled "PROGRESS ADJUSTMENT METHOD AND APPARATUS, ELECTRONIC DEVICE AND STORAGE MEDIUM", the disclosures of which are incorporated herein by reference in their entireties.

TECHNICAL FIELD

Embodiments of the present disclosure relate to the field of computer technology, for example, a progress adjustment method and apparatus, an electronic device, and a storage medium.

BACKGROUND

Currently, in order to avoid a video picture from being excessively shaded, a height of a progress bar of the video is generally set to a small height value.

However, when the progress bar is small in height, difficulty of control of the progress bar by the user will be increased, and false trigger for other controls is easily caused, resulting in poor user experience in adjusting the playback progress of the video.

SUMMARY

The embodiments of the present disclosure provide a progress adjustment method and apparatus, an electronic device and a storage medium, to reduce the difficulty of control of the progress bar.

In a first aspect, an embodiment of the present disclosure provides a progress adjustment method, comprising:
  receiving a progress adjustment operation acting on a progress bar of a target content;
  in response to the progress adjustment operation, expanding a size of the progress bar, and adjusting a progress of the target content according to the progress adjustment operation; and
  in response to determining that the progress adjustment operation ends, stopping adjusting, according to the progress adjustment operation, the progress of the target content.

In a second aspect, an embodiment of the present disclosure further provides a progress adjustment apparatus, comprising:
  an adjustment operation receiving module configured to receive a progress adjustment operation acting on a progress bar of a target content;
  a progress adjustment module configured to, in response to the progress adjustment operation, expand a size of the progress bar, and adjust a progress of the target content according to the progress adjustment operation; and
  an adjustment stopping module configured to, in response to determining that the progress adjustment operation ends, stop adjusting, according to the progress adjustment operation, the progress of the target content.

In a third aspect, an embodiment of the present disclosure further provides an electronic device, comprising:
  one or more processors; and
  a memory configured to store one or more programs,
  wherein the one or more programs, when executed by the one or more processors, cause the one or more processors to implement the progress adjustment method according to the embodiments of the present disclosure.

In a fourth aspect, an embodiment of the present disclosure further provides a non-transitory computer-readable storage medium having thereon stored a computer program which, when executed by a processor, implements the progress adjustment method according to the embodiments of the present disclosure.

DETAILED DESCRIPTION

It should be understood that various steps recited in method embodiments of the present disclosure may be performed in a different order, and/or performed in parallel. Moreover, the method embodiments may include additional steps and/or omit performing the illustrated steps. The scope of the present disclosure is not limited in this respect.

The term "comprising" and variations thereof used herein are intended to be open-ended, i.e., "comprising but not limited to". The term "based on" is "at least partially based on". The term "one embodiment" means "at least one embodiment"; the term "another embodiment" means "at least one other embodiment"; and the term "some embodiments" means "at least some embodiments". Definitions related to other terms will be given in the following description.

It should be noted that the concepts "first", "second", and the like mentioned in the present disclosure are only used for distinguishing different devices, modules or units, and are not used for limiting the order or interdependence of functions performed by the devices, modules or units.

It should be noted that modifications of "a" or "a plurality" mentioned in this disclosure are intended to be illustrative rather than restrictive, and that those skilled in the art should appreciate that they should be understood as "one or more" unless otherwise explicitly stated in the context.

Names of messages or information exchanged between a plurality of devices in the embodiments of the present disclosure are for illustrative purposes only, and are not intended to limit the scope of the messages or information.

Figure 1:
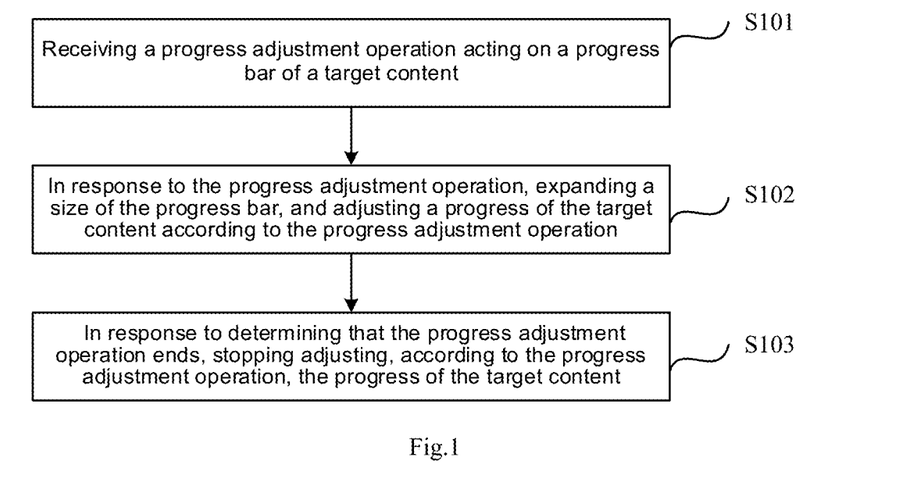
FIG. 1 is a schematic flow diagram of a progress adjustment method provided by an embodiment of the present disclosure.

FIG. 1 is a schematic flow diagram of a progress adjustment method provided by an embodiment of the present disclosure. The method may be performed by a progress adjustment apparatus, wherein the apparatus may be implemented by software and/or hardware, and may be configured in an electronic device, for example, a mobile phone or a tablet computer. The progress adjustment method provided by an embodiment of the present disclosure is applicable to a scenario where progress adjustment is made through a progress bar. As shown in FIG. 1, the progress adjustment method provided by this embodiment may comprise:

S101, receiving a progress adjustment operation acting on a progress bar of a target content.

The target content is an object with a progress bar, i.e., an object whose presentation progress is adjusted through the progress bar, such as a video, audio, or document. The audio may include music, audio book, recording, etc., and the document may be a novel or article, etc.; the following description will be made by taking an example that the target content is a video. The progress adjustment operation is an operation of adjusting the presentation progress of the target content, for example, an operation of adjusting playback progress of the video, which may be a drag operation and/or a click operation acting on the progress bar.

Taking an example that the target content is a video, the electronic device plays back the video in a video playback page and displays a progress bar of the video. When a user wants to adjust the playback progress of the video, the user may perform a progress adjustment operation on the progress bar of the video, such as an operation of dragging a slider in the progress bar or clicking a certain response position of the progress bar. The electronic device may receive the progress adjustment operation performed by the user.

In this embodiment, the progress adjustment operation may be set as needed, for example, the progress adjustment operation may comprise a target sliding operation that acts within a preset response area of the progress bar and has a sliding direction parallel to a movement direction of the slider in the progress bar.

The preset response area may be a preset response area of the progress bar, which may be larger than a display area occupied by the progress bar when the progress adjustment operation has not been received. For example, a size value of the preset response area in the direction perpendicular to the movement direction of the slider of the progress bar may be greater than a size value of the progress bar in the direction perpendicular to the movement direction of the slider thereof when the progress adjustment operation has not been received. That is, when the progress bar is displayed in a form of a horizontal bar, a height of the preset response area may be greater than a height of the progress bar when the progress adjustment operation has not been received. For example, the height of the preset response area may be set to a display height of the progress bar after being expanded based on the progress adjustment operation. By setting a larger response area for the progress bar, it makes convenient for the user to trigger the progress bar, thereby reducing the difficulty of control of the progress bar.

The movement direction of the slider in the progress bar may be understood as a movement direction of the slider in the progress bar of the target content when the progress of the target content is adjusted, for example, when the progress bar is displayed in a form of a horizontal bar, the slider may move horizontally, and the target sliding operation may be a horizontal sliding operation acting within the preset response area of the progress bar. When the progress bar is displayed in a form of a vertical bar, the slider may move vertically, and the target sliding operation may be a vertical sliding operation acting within the preset response area of the progress bar. The following description will be made by taking an example that the progress bar is displayed in the form of the horizontal bar.

Exemplarily, when the user wants to adjust the progress of the target content, the user may perform the horizontal sliding operation within the preset response area of the progress bar of the target content, for example, slide leftwards or slide rightwards within the preset response area. The electronic device may, when detecting the horizontal sliding operation of the user, determine that the progress adjustment operation for the target content has been received.

In this embodiment, after a larger response area is set for the progress bar, response areas of other controls in the page than the progress bar, that only respond to a click operation, may not be changed. At this time, since the response area of the progress bar might overlap with the response areas of the other controls in the page, the progress bar may be set not to respond to a click operation that acts on the response area thereof. The progress bar may also be set to respond only to a click operation that acts within a non-overlapping sub-area whose response area does not overlap with a response area of any other control. For example, the electronic device may, when having received a click operation that acts on and only acts within the response area of the progress bar, determine that the progress adjustment operation is received; and when having received a click operation that acts on but not only acts within the response area of the progress bar, determine that the click operation acts on another control, and trigger, according to the click operation, the other controls corresponding to the response area where the click operation is located, which is not limited in this embodiment.

S102, in response to the progress adjustment operation, expanding a size of the progress bar, and adjusting a progress of the target content according to the progress adjustment operation.

In this embodiment, when the user triggers the progress bar of the target content, a display size of the progress bar may be expanded, for example, a display height and/or a display width of the progress bar are expanded, to facilitate the user viewing and controlling the progress bar.

For example, the electronic device may, when performing a progress adjustment operation for the target content, expand a size of the progress bar of the target content. For example, the progress bar of the target content is expanded to a larger preset size, and the progress of the target content is adjusted based on the progress adjustment operation. For example, the slider in the progress bar of the target content may be controlled to move with the target sliding operation of the user, and the progress of the target content may be updated in real time according to a progress node corresponding to a current position of the slider in the moving process.

S103, in response to determining that the progress adjustment operation ends, stopping adjusting, according to the progress adjustment operation, the progress of the target content.

Exemplarily, when it is detected that the progress adjustment operation ends, adjusting the progress of the target content according to the progress adjustment operation may be stopped, for example, controlling the slider in the progress bar of the target content to move with the target sliding operation is stopped.

It can be understood that, if the target content is a video, when the video is played back after the progress adjustment operation ends, the progress of the playback of the video may be displayed through the progress bar. For example, in the process of the playback of the video, the position of the slider in the progress bar is adjusted in real time based on a time node to which the video is currently played back, and the current playback progress of the video is identified through the position of the slider.

In addition, when the user adjustment ends, or when the user adjustment ends for a preset duration, the size of the progress bar may be reduced to facilitate the user viewing the target content.

Exemplarily, two different display sizes, such as an original size and an expansion size, may be preset for the progress bar of the target content. When the progress adjustment operation has been received, the progress bar of the target content can be expanded from the original size to the expansion size; and when it is detected that the user stops sliding, the progress bar of the target content may be reduced from the expansion size to the original size.

In an implementation, the receiving the progress adjustment operation acting on the progress bar of the target content comprises: by a parent layout, in response to having sequentially received a Down event and a Move event that act within the preset response area, sequentially sending the Down event and the Move event to a first child view corresponding to the progress bar, to expand a size of the progress bar in response to the Down event and adjust the progress of the target content in response to the Move event by the first child view; and by the parent layout, continuing to receive an Up event corresponding to the Move event, and sending the Up event to the first child view, to determine that, by the first child view, in response to the Up event, the progress adjustment operation ends.

In the above implementation, the page may be provided with one parent view and a plurality of child views. The first child view may be a child view corresponding to the progress bar of the target content. The Move event may be a Move event whose movement direction is parallel to the movement direction of the slider in the progress bar.

Exemplarily, the parent layout of the page may, when having received a Down event that acts within the preset response area of the progress bar and a Move event corresponding to the Down event (i.e., a Move event that belongs to the same triggering operation as the Down event), that is, when determining that the Down event is a Down event in a sliding operation rather than a Down event in a click operation, sequentially send the Down event and the Move event to the child view corresponding to the progress bar of the target content; and when having received an Up event that belongs to the same triggering operation as the Down operation and the Move operation, send the Up event to the progress bar of the target content.

The child view corresponding to the progress bar of the target content may, when having received the Down event sent by the parent layout, expand a size of the progress bar of the target content. For example, the size of the progress bar of the target content in the direction perpendicular to the movement direction of the slider in the progress bar is expanded to a first size value. When the Move event sent by the parent layout has been received, the slider in the progress bar of the target content can be controlled to move in the movement direction of the Move event to adjust the progress of the target content. When having received the UP event sent by the parent layout, it may be determined that the progress adjustment operation ends, so that adjusting the progress of the target content based on the progress adjustment operation is stopped, and size reduction on the progress bar of the target content may be further performed. For example, the size of the progress bar of the target content in the direction perpendicular to the movement direction of the slider in the progress bar is reduced from the first size value to a second size value.

In addition, if a next event belonging to the same triggering operation as the Down event that is received by the parent layout of the page after the Down event acting within the preset response area of the progress bar has been received, is an Up event rather than a Move event, it may be determined that the Down event is a Down event in a click operation rather than a Down event in a sliding operation. At this time, if the Down event acts within an overlapping area between the response area of the progress bar of the target content and a response area of some other control in the page, the Down event and the Up event may be sequentially sent to a child view corresponding to the other control, to facilitate the other control responding to the Down event and the Up event.

At this time, for example, the progress adjustment method provided by this embodiment further comprises: by the parent layout, in response to having sequentially received a Down event and an Up event that act within the preset response area, and in response to determining that the Down event and the Up event act within an overlapping area between the preset response area and a target response area, sequentially sending the Down event and the Up event to a second child view to which the target response area belongs, to respond to the Down event and the Up event by the second child view. The second child view is a child view corresponding to other control to which other response areas than the preset response area, on which the Down event acts, belongs, that is, when the Down event acts within an overlapping area between the response area of the progress bar and a response area of some other control, the second child view is a child view corresponding to the other control.

Furthermore, in response to determining that the Down event acts within a sub-area in the response area of the progress bar of the target content that does not overlap with a response area of any other control, the parent layout may not distribute the Down event and the UP event. The Down event and the Up event may also be sequentially sent to the child view corresponding to the progress bar of the target content, when having received the Down event sent by the parent layout, the child view corresponding to the progress bar of the target content can expand a size of the progress bar of the target content and move the slider in the progress bar to a position on which the Down event acts, and the progress bar of the target content can, when having received the Up event sent by the parent layout, determine that the progress adjustment operation ends.

In the above implementation, when having received the Down event, the parent layout does not immediately determine a child view to which the Down event belongs and send the Down event to the child view. Instead, after having received a next event (such as a Move event or an UP event) after the Down event, that is, after being able to determine a type of a triggering operation (such as a sliding operation or a click operation) to which the Down event belongs, the parent layout determines the child view to which the Down event belongs based on the type of the triggering operation to which the Down event belongs, and sends the Down event to the child view. This can avoid false triggering or inability to trigger the progress bar when the Down event acts on an overlapping area between the response area of the progress bar of the target content and a response area of other control in the page, thereby improving the user experience in adjusting the progress bar.

In the progress adjustment method provided by this embodiment, a progress adjustment operation acting on a progress bar of a target content is received; in response to the progress adjustment operation, size of the progress bar of the target content is expanded, and the progress of the target content is adjusted according to the progress adjustment operation; and when the progress adjustment operation ends, adjusting the progress of the target content according to the progress adjustment operation is stopped. In this embodiment, by adopting the above technical solution, when the progress adjustment operation has been received, the size of the progress bar is expanded, which can facilitate the user viewing the progress bar and performing progress adjustment, so as to decrease the difficulty of control of the progress bar, and improve the user experience in performing progress adjustment.

Figure 2:
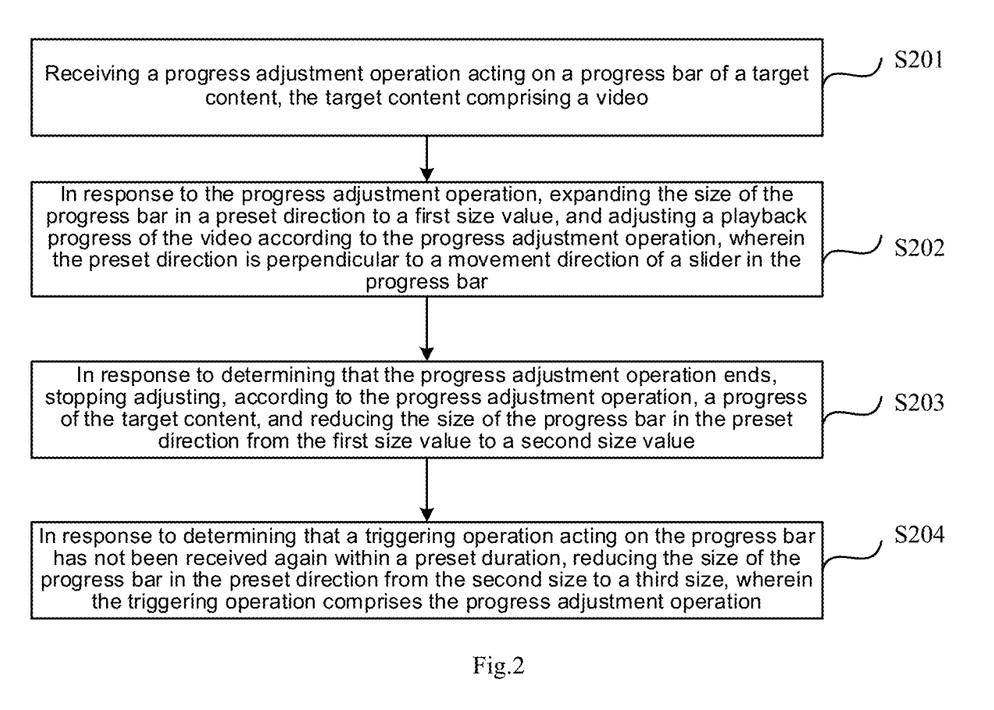
FIG. 2 is a schematic flow diagram of another progress adjustment method provided by an embodiment of the present disclosure.

FIG. 2 is a schematic flow diagram of another progress adjustment method provided by an embodiment of the present disclosure. The solution in this embodiment may be combined with one or more example solutions in the above embodiment. For example, the expanding the size of the progress bar comprises: expanding the size of the progress bar in a preset direction to a first size value, wherein the preset direction is perpendicular to a movement direction of a slider in the progress bar.

For example, the progress adjustment method provided by this embodiment further comprises: when the progress adjustment operation ends, reducing the size of the progress bar in the preset direction from the first size value to a second size value.

For example, after the reducing the size of the progress bar in the preset direction from the first size value to the second size value, the method further comprises: in response to determining that a triggering operation acting on the progress bar has not been received again within the preset duration, reducing the size of the progress bar in the preset direction from the second size to a third size, wherein the triggering operation comprises the progress adjustment operation.

For example, the target content comprises a video, the adjusting a progress of the target content according to the progress adjustment operation comprising: adjusting a playback progress of the video according to the progress adjustment operation.

As shown in FIG. 2, the progress adjustment method provided by this embodiment may comprise:

S201, receiving a progress adjustment operation acting on a progress bar of a target content, the target content comprising a video.

S202, in response to the progress adjustment operation, expanding a size of the progress bar in a preset direction to a first size value, and adjusting playback progress of the video according to the progress adjustment operation, wherein the preset direction is perpendicular to a movement direction of a slider in the progress bar.

Figure 3:
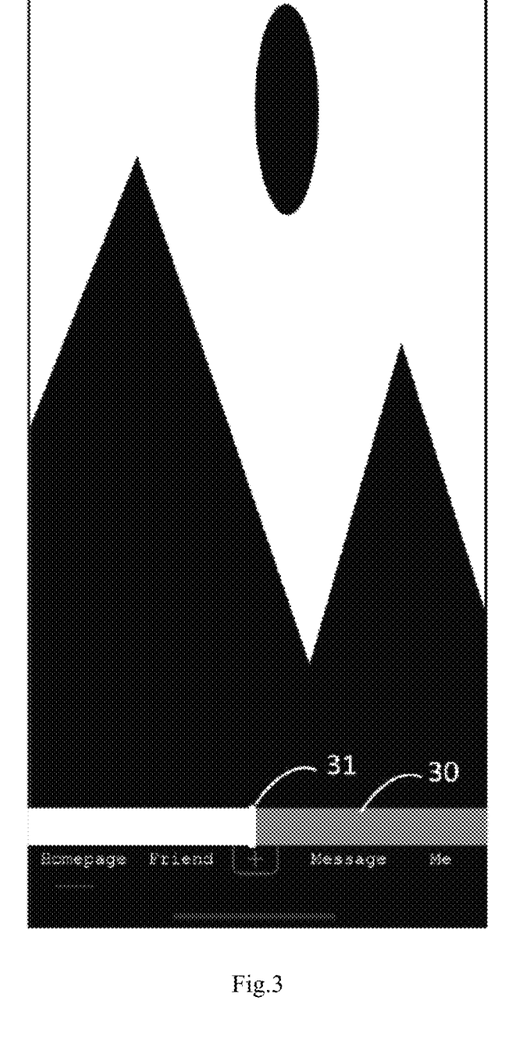
FIG. 3 is a schematic diagram of a display mode of a progress bar provided by an embodiment of the present disclosure.

In this embodiment, when the progress adjustment operation for the video played back in a video playback page has been received, a height of the progress bar 30 of the video may be displayed to a larger height value, i.e., the first size value (as shown in FIG. 3), to ensure that a user can clearly view the progress bar 30 and adjust the playback progress of the video through the progress bar 30.

For example, taking an example that the progress bar 30 is displayed in a form of a horizontal bar and the progress adjustment operation is a target sliding operation, when having received the progress adjustment operation for the video played back in the video playback page, the electronic device may, in response to the progress adjustment operation, expand the height of the progress bar 30 from a second size value (shown in FIG. 4) or a third size value (shown in FIG. 5) before the progress adjustment operation has been received to the first size value (shown in FIG. 3), to control a slider 31 in the progress bar 30 to move in a sliding direction of the target sliding operation, and adjust the playback progress of the video in real time to a time node corresponding to a position of the slider 31 at a current time moment in the moving process, until a sliding end position of the target sliding operation. The first size value is greater than the second size value, the second size value is greater than the third size value, and the first size value, the second size value, and the third size value may be specifically set as needed, which is not limited in this embodiment.

Figure 4:
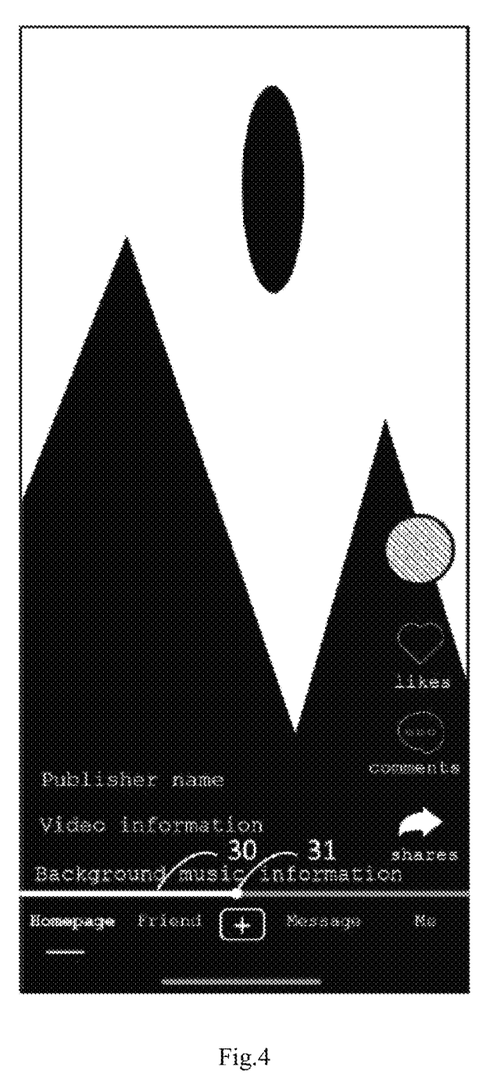
FIG. 4 is a schematic diagram of another display mode of a progress bar provided by an embodiment of the present disclosure.
Figure 5:
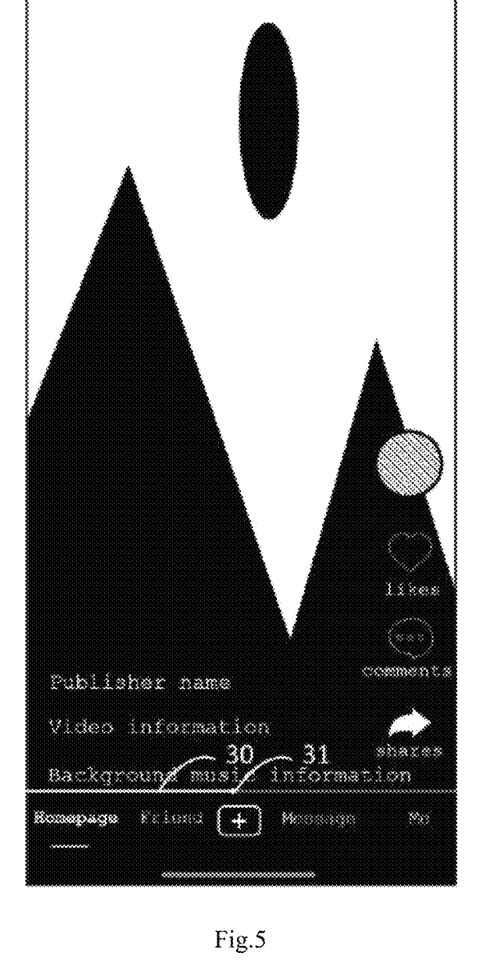
FIG. 5 is a schematic diagram of still another display mode of a progress bar provided by an embodiment of the present disclosure.

In addition, as shown in FIGS. 3 to 5, when the size of the progress bar 30 of the video in the preset direction is expanded to the first size, display of other controls (such as a share control, a comment control, a like control, a background music control in FIGS. 3-5) for the video than the progress bar 30 and related information (such as publisher information of the video or video information) of the target content displayed in the page may be cancelled, and display of a page control (such as a homepage control for instructing the electronic device to display a homepage, a friend control for instructing the electronic device to display a friend page, and a message control for instructing the electronic device to display a message page in FIGS. 3-5) in the page may be weakened, to avoid the display of the related information or other controls from interfering with the user viewing the progress bar 30 and controlling the slider 31 in the progress bar 30, so that the convenience of the user in adjusting the progress of the video is further improved.

S203, in response to determining that the progress adjustment operation ends, stopping adjusting, according to the progress adjustment operation, the progress of the target content, and reducing the size of the progress bar in the preset direction from the first size value to a second size value.

In this embodiment, when the user stops performing the progress adjustment operation, the size of the progress bar in the preset direction may be temporarily reduced from the first size to a size value less than the first size value and greater than a third size value, i.e., the second size value, to take into account both the user's requirements of viewing the target content and performing the progress adjustment operation again in a short time.

Taking an example that the progress bar 30 is presented in a form of a horizontal bar, the electronic device may, when having received the progress adjustment operation, expand a height of the progress bar 30 of the target content to the first size value, as shown in FIG. 3; and adjust the progress of the target content based on the progress adjustment operation; and, when detecting that the progress adjustment operation ends, stop adjusting, according to the progress adjustment operation, the progress of the target content, and reduce the height of the progress bar 30 of the target content from the first size value to the second size value, as shown in FIG. 4.

S204, in response to determining that a triggering operation acting on the progress bar has not been received again within a preset duration, reducing the size of the progress bar in the preset direction from the second size to a third size, wherein the triggering operation comprises the progress adjustment operation.

In this embodiment, when the user has not triggered the progress bar for a long time, for example, when the user has not performed the progress adjustment operation again for a long time, the size of the progress bar in the preset direction may be reduced again, to minimize the shieling of the progress bar on the target content, and provide convenience for the user viewing the target content.

Taking an example that the progress bar 30 is presented in a form of a horizontal bar, the electronic device may, when detecting that the progress adjustment operation ends, reduce the height of the progress bar 30 of the target content from the first size value to the second size value, as shown in FIG. 4; and continue detecting whether the progress adjustment operation for the video has been received again, and in response to determining that the progress adjustment operation for the target content has not been received again within a preset duration, reduce the height of the progress bar 30 of the target content again, to reduce the progress bar 30 of the target content from the second size value to the third size value, as shown in FIG. 5. The preset duration can be set as needed, for example, a duration of 1 s, 2 s, or the like; and the triggering operation may include the progress adjustment operation, and may further include a non-progress adjustment operation acting on the progress bar.

In response to determining that the progress adjustment operation for the target content has been received again within the preset duration, the height of the progress bar of the target content may be expanded from the second size value to the first size value, and progress adjustment on the target content may be performed again based on the progress adjustment operation. In response to determining that the progress adjustment operation for the target content has been received again after a duration greater than the preset duration, the height of the progress bar of the target content may be expanded from the third size value to the first size value, and progress adjustment on the target content may be performed again based on the progress adjustment operation.

It can be understood that, in this embodiment, in addition to adjusting the size of the progress bar of the target content, display brightness and/or display color of the progress bar of the target content may be further adjusted. Taking an example that the display brightness is adjusted, when having received the progress adjustment operation, the electronic device may expand the height of the progress bar of the target content to the first size value, adjust the display brightness of the progress bar of the target content from a preset first brightness value to a preset second brightness value, and adjust the progress of the target content based on the progress adjustment operation; when detecting that triggers of the progress operation end, reduce the height of the progress bar of the target content from the first size value to the second size value; and when a triggering operation acting on the progress bar has not been received within the preset duration, reduce the height of the progress bar of the target content from the second size value to the third size value, and adjust the display brightness of the progress bar of the target content from the second brightness value to the preset first brightness value. The first brightness value is less than the second brightness value.

According to the progress adjustment method provided by this embodiment, when a progress adjustment operation is received, a size of a progress bar of a target content in a preset direction is expanded to a first size value, when it is detected that the progress adjustment operation ends, the size of the progress bar of the target content in the preset direction is reduced from the first size value to a second size value, and when a duration when the triggering operation acting on the progress bar is not detected reaches a preset duration, the size of the progress bar of the target content in the preset direction is reduced from the second size value to a third size value. In this embodiment, by adopting the above technical solution, both the user's requirements of viewing the target content and performing the progress adjustment operation again in a short time can be taken into account, so that the convenience of the user in adjusting the progress of the target content is further improved.

Figure 6:
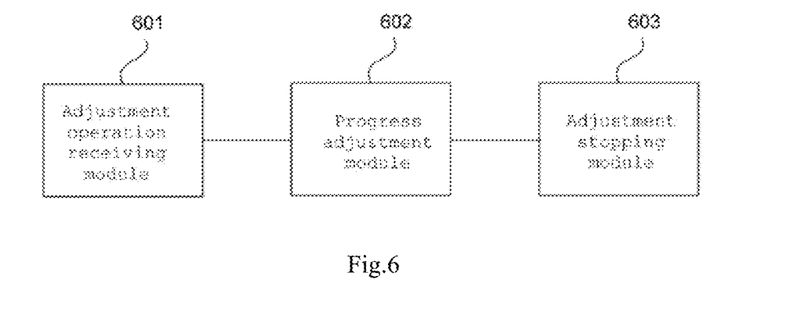
FIG. 6 is a block diagram of a structure of a progress adjustment apparatus provided by an embodiment of the present disclosure.

FIG. 6 is a block diagram of a structure of a progress adjustment apparatus provided by an embodiment of the present disclosure. The apparatus can be implemented by software and/or hardware, can be configured in an electronic device, for example, in a mobile phone or a tablet computer, and can adjust a progress of a target content and a size of a progress bar of the target content by executing the progress adjustment method. As shown in FIG. 6, the progress adjustment apparatus provided by this embodiment may comprise: an adjustment operation receiving module 601, a progress adjustment module 602, and an adjustment stopping module 603, wherein the adjustment operation receiving module 601 is configured to receive a progress adjustment operation acting on a progress bar of a target content;

the progress adjustment module 602 is configured to, in response to the progress adjustment operation, expand a size of the progress bar, and adjust a progress of the target content according to the progress adjustment operation; and the adjustment stopping module 603 is configured to, when the progress adjustment operation ends, stop adjusting, according to the progress adjustment operation, the progress of the target content.

In the progress adjustment apparatus provided by this embodiment, by the adjustment operation receiving module, a progress adjustment operation acting on a progress bar of a target content is received; by the progress adjustment module, in response to the progress adjustment operation, size of the progress bar of the target content is expanded, and the progress of the target content is adjusted according to the progress adjustment operation; and by the adjustment stopping module, when the progress adjustment operation ends, adjusting the progress of the target content according to the progress adjustment operation is stopped. In this embodiment, by adopting the above technical solution, when the progress adjustment operation is received, the size of the progress bar is expanded, which can provide convenience for the user viewing the progress bar and performing progress adjustment, so that the difficulty of control of the progress bar is decreased, and the user experience in performing progress adjustment is improved.

In the above solution, the progress adjustment module 602 may be configured to: expand a size of the progress bar in a preset direction to a first size value, wherein the preset direction is perpendicular to a movement direction of a slider in the progress bar.

In the above solution, the adjustment stopping module 603 may further be configured to: when the progress adjustment operation ends, reduce the size of the progress bar in the preset direction from the first size value to a second size value.

For example, the progress adjustment apparatus provided by this embodiment may further comprise: a progress bar reduction module configured to, after the size of the progress bar in the preset direction is reduced from the first size value to the second size value, in response to determining that a triggering operation acting on the progress bar has not been received again within a preset duration, reduce the size of the progress bar in the preset direction from the second size to a third size, wherein the triggering operation comprises the progress adjustment operation.

In the above solution, the target content may comprise a video, and the progress adjustment module 602 may be configured to: adjust playback progress of the video according to the progress adjustment operation.

In the above solution, the progress adjustment operation may comprise a target sliding operation that acts within a preset response area of the progress bar and has a sliding direction parallel to the movement direction of the slider in the progress bar.

In the above solution, the adjustment operation receiving module 601 may be configured to: by a parent layout, in response to having sequentially received a Down event and a Move event that act within the preset response area, sequentially send the Down event and the Move event to a first child view corresponding to the progress bar, to expand a size of the progress bar in response to the Down event and adjust the progress of the target content in response to the Move event by the first child view; and by the parent layout, continue to receive an Up event corresponding to the Move event and send the Up event to the first child view, to determine that, by the first child view, in response to the Up event, the progress adjustment operation ends.

For example, the progress adjustment apparatus provided by this embodiment may further comprise: a click operation receiving module configured to, by the parent layout, in response to having sequentially received a Down event and an UP event acting within the preset response area, and in response to determining that the Down event and the UP event act within an overlapping area between the preset response area and a target response area, sequentially send the Down event and the UP event to a second child view to which the target response area belongs, to respond to the Down event and the UP event by the second child view.

The progress adjustment apparatus provided by the embodiment of the present disclosure, can execute the progress adjustment method provided by any embodiment of the present disclosure, and has the corresponding functional modules and beneficial effects of executing the progress adjustment method. For technical details that are not described in detail in this embodiment, reference may be made to the progress adjustment method provided by any embodiment of the present disclosure.

Figure 7:
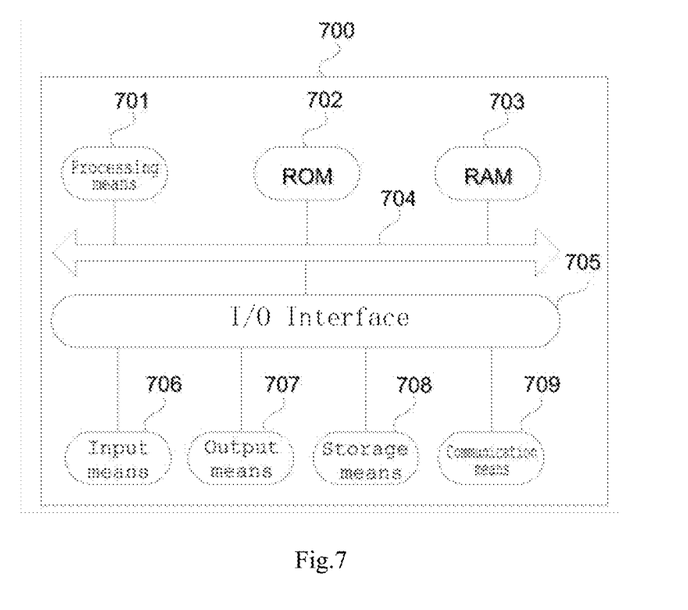
FIG. 7 is a schematic diagram of a structure of an electronic device provided by an embodiment of the present disclosure.

Reference is made below to FIG. 7, which shows a schematic diagram of a structure of an electronic device (e.g., terminal device) 700 suitable for implementing embodiments of the present disclosure. The terminal device in the embodiments of the present disclosure may include, but is not limited to, a mobile terminal such as a mobile phone, a notebook computer, a digital broadcast receiver, a PDA (personal digital assistant), a PAD (tablet computer), a PMP (portable multimedia player), and a vehicle-mounted terminal (e.g., a vehicle-mounted navigation terminal), and a fixed terminal such as a digital TV, and a desktop computer. The electronic device shown in FIG. 7 is only an example, and should not bring any limitation to the functions and the scope of use of the embodiments of the present disclosure.

As shown in FIG. 7, the electronic device 700 may comprise a processing means (e.g., central processing unit, graphical processing unit, etc.) 701 that may perform various suitable actions and processes according to a program stored in a read-only memory (ROM) 702 or a program loaded from a storage means 708 into a random access memory (RAM) 703. In the RAM 703, various programs and data required for the operation of the electronic device 700 are also stored. The processing means 701, the ROM 702, and the RAM 703 are connected to each other by a bus 704. An input/output (I/O) interface 705 is also connected to the bus 704.

Generally, the following means may be connected to the I/O interface 705: an input means 706 including, for example, a touch screen, touch pad, keyboard, mouse, camera, microphone, accelerometer, gyroscope, etc.; an output means 707 including, for example, a liquid crystal display (LCD), speaker, vibrator, etc.; a storage means 708 including, for example, a magnetic tape, hard disk, etc.; and a communication means 709. The communication means 709 may allow the electronic device 700 to communicate with other devices, in a wireless or wired manner, to exchange data. While FIG. 7 illustrates the electronic device 700 having various means, it should be understood that not all illustrated means are required to be implemented or provided. More or fewer means may be alternatively implemented or provided.

For example, according to an embodiment of the present disclosure, the processes described above with reference to the flow diagrams may be implemented as a computer software program. For example, an embodiment of the present disclosure comprises a computer program product, the computer program product comprising a computer program carried on a non-transitory computer-readable medium, the computer program containing program code for performing the method illustrated by the flow diagrams. In such an embodiment, the computer program may be downloaded from a network via the communication means 709 and installed, or installed from the storage means 708, or installed from the ROM 702. The computer program, when executed by the processing means 701, performs the above functions defined in the method of the embodiments of the present disclosure.

It should be noted that the above computer-readable medium of the present disclosure may be a computer-readable signal medium or a computer-readable storage medium or any combination of the above two. The computer-readable storage medium may be, for example, but is not limited to, an electronic, magnetic, optical, electromagnetic, infrared, or semiconductor system, apparatus, or device, or any combination of the foregoing. More specific examples of the computer-readable storage medium may include, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium may be any tangible medium containing or storing a program, wherein the program can be used by or in conjunction with an instruction execution system, apparatus, or device. However, in the present disclosure, the computer-readable signal medium may include a data signal propagated in baseband or as part of a carrier wave, in which computer-readable program code is carried. Such a propagated data signal may take a variety of forms, including, but not limited to, an electromagnetic signal, optical signal, or any suitable combination of the forgoing. The computer-readable signal medium may also be any computer-readable medium other than the computer-readable storage medium, wherein the computer-readable signal medium can send, propagate, or transmit a program for use by or in conjunction with an instruction execution system, apparatus, or device. The program code contained on the computer-readable medium may be transmitted using any appropriate medium, including but not limited to: a wire, an optical cable, RF (Radio Frequency), etc., or any suitable combination of the foregoing.

In some embodiments, a client and a server may communicate using any currently known or future developed network protocol, such as HTTP (HyperText Transfer Protocol), and may be interconnected with any form or medium of digital data communication (e.g., a communication network). Examples of the communication network include a local area network ("LAN"), a wide area network ("WAN"), an internet (e.g., the Internet), and a peer-to-peer network (e.g., an ad hoc peer-to-peer network), as well as any currently known or future developed network.

The above computer-readable medium may be contained in the above electronic device; or may be exist separately without being assembled into the electronic device.

The above computer-readable medium has one or more programs carried thereon, wherein the above one or more programs, when executed by the electronic device, cause the electronic device to: receive a progress adjustment operation acting on a progress bar of a target content; in response to the progress adjustment operation, expand a size of the progress bar, and adjust a progress of the target content according to the progress adjustment operation; and when the progress adjustment operation ends, stop adjusting, according to the progress adjustment operation, the progress of the target content.

The computer program code for performing the operation of the present disclosure may be written in one or more programming languages or a combination thereof, wherein the above programming language includes but is not limited to an object-oriented programming language such as Java, Smalltalk, C++, and also includes a conventional procedural programming language, such as the "C" programming language or a similar programming language. The program code may be executed entirely on a user's computer, partly on the user's computer, as a stand-alone software package, partly on the user's computer and partly on a remote computer, or entirely on the remote computer or server. In a scenario where the remote computer is involved, the remote computer may be connected to the user's computer through any type of network, including a local area network (LAN) or a wide area network (WAN), or may be connected to an external computer (for example, through the Internet using an Internet service provider).

The flow diagrams and block diagrams in the drawings illustrate the possibly implemented architecture, functions, and operations of the system, method and computer program product according to various embodiments of the present disclosure. In this regard, each block in the flow diagrams or block diagrams may represent a module, program segment, or portion of code, which includes one or more executable instructions for implementing a specified logical function. It should also be noted that, in some alternative implementations, functions noted in blocks may occur in a different order from those noted in the drawings. For example, two blocks shown in succession may, in fact, be executed substantially concurrently, or the blocks may sometimes be executed in a reverse order, which depends upon the functions involved. It will also be noted that each block in the block diagrams and/or flow diagrams, and a combination of the blocks in the block diagrams and/or flow diagrams, can be implemented by a special-purpose hardware-based system that performs specified functions or operations, or a combination of special-purpose hardware and computer instructions.

The involved unit described in the embodiments of the present disclosure may be implemented by software or hardware. The name of the unit does not, in some cases, constitute a limitation on the unit itself.

The functions described above herein may be executed, at least partially, by one or more hardware logic components. For example, without limitation, exemplary types of the hardware logic component that may be used include: a field programmable gate array (FPGA), application specific integrated circuit (ASIC), application specific standard product (ASSP), system on chip (SOC), complex programmable logic device (CPLD), and the like.

In the context of this disclosure, a machine-readable medium may be a tangible medium, which can contain, or store a program for use by or in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium include an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

According to one or more embodiments of the present disclosure, example 1 provides a progress adjustment method, comprising:
  receiving a progress adjustment operation acting on a progress bar of a target content;
  in response to the progress adjustment operation, expanding a size of the progress bar, and adjusting a progress of the target content according to the progress adjustment operation; and
  in response to determining that the progress adjustment operation ends, stopping adjusting, according to the progress adjustment operation, the progress of the target content.

According to one or more embodiments of the present disclosure, example 2 provides the method according to example 1, wherein the expanding the size of the progress bar comprises:
  expanding the size of the progress bar in a preset direction to a first size value, wherein the preset direction is perpendicular to a movement direction of a slider in the progress bar.

According to one or more embodiments of the present disclosure, example 3 provides the method according to example 2, further comprising:
  in response to determining that the progress adjustment operation ends, reducing the size of the progress bar in the preset direction from the first size value to a second size value.

According to one or more embodiments of the present disclosure, example 4 provides the method according to example 3, after the reducing the size of the progress bar in the preset direction from the first size value to the second size value, further comprising:

in response to determining that a triggering operation acting on the progress bar has not been received again within a preset duration, reducing the size of the progress bar in the preset direction from the second size to a third size, wherein the triggering operation comprises the progress adjustment operation.

According to one or more embodiments of the present disclosure, example 5 provides the method according to example 1, the target content comprising a video, and the adjusting the progress of the target content according to the progress adjustment operation comprising:

adjusting a playback progress of the video according to the progress adjustment operation.

According to one or more embodiments of the present disclosure, example 6 provides the method according to any of examples 1 to 5, the progress adjustment operation comprising a target sliding operation that acts within a preset response area of the progress bar and has a sliding direction parallel to a movement direction of a slider in the progress bar.

According to one or more embodiments of the present disclosure, example 7 provides the method according to example 6, the receiving the progress adjustment operation acting on the progress bar of the target content, comprising:

by a parent layout, in response to having sequentially received a Down event and a Move event acting within the preset response area, sequentially sending the Down event and the Move event to a first child view corresponding to the progress bar, to expand a size of the progress bar in response to the Down event and adjust the progress of the target content in response to the Move event by the first child view; and by the parent layout, continuing to receive an Up event corresponding to the Move event, and sending the Up event to the first child view, to determine, by the first child view, the progress adjustment operation ends in response to the Up event.

According to one or more embodiments of the present disclosure, example 8 provides the method according to example 7, further comprising:

by the parent layout, in response to having sequentially received a Down event and an Up event acting within the preset response area, and in response to determining that the Down event and the Up event act within an overlapping area between the preset response area and a target response area, sequentially sending the Down event and the Up event to a second child view to which the target response area belongs, to respond to the Down event and the Up event by the second child view.

According to one or more embodiments of the present disclosure, example 9 provides a progress adjustment apparatus, comprising:

an adjustment operation receiving module configured to receive a progress adjustment operation acting on a progress bar of a target content;

a progress adjustment module configured to, in response to the progress adjustment operation, expand a size of the progress bar, and adjust a progress of the target content according to the progress adjustment operation; and an adjustment stopping module configured to, when the progress adjustment operation ends, stop adjusting, according to the progress adjustment operation, the progress of the target content.

According to one or more embodiments of the present disclosure, example 10 provides an electronic device, comprising:

one or more processors; and a memory configured to store one or more programs, wherein the one or more programs, when executed by the one or more processors, cause the one or more processors to implement the progress adjustment method according to any of the examples 1 to 8.

According to one or more embodiments of the present disclosure, example 11 provides a computer-readable storage medium having thereon stored a computer program which, when executed by a processor, implements the progress adjustment method according to any of the examples 1 to 8.

Further, while various operations are depicted in a specific order, this should not be understood as requiring that these operations be performed in the specific order shown or in a sequential order. Under certain circumstances, multitasking and parallel processing might be advantageous. Similarly, while several specific implementation details are included in the above discussion, these should not be construed as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combination.

What is claimed is:

1. A method of adjusting a progress of presenting a target content by an electronic device comprising a processor and a memory, the method comprising:

receiving a progress adjustment operation performed by a user on a progress bar of the target content, wherein the progress bar comprises a slider configured to be movable along the progress bar, and wherein the progress adjustment operation comprises a sliding operation with a sliding direction parallel to a movement direction of the slider;

in response to the progress adjustment operation performed by the user, expanding a size of the progress bar to a larger value in a direction perpendicular to the movement direction of the slider;

adjusting the progress of presenting the target content according to the progress adjustment operation performed by the user; and in response to determining that the progress adjustment operation ends, stopping adjusting, according to the progress adjustment operation, the progress of the target content.

2. The method according to claim 1, wherein the expanding the size of the progress bar comprises:

expanding the size of the progress bar in a preset direction to a first size value, wherein the preset direction is perpendicular to a movement direction of a slider in the progress bar.

3. The method according to claim 2, further comprising:

in response to determining that the progress adjustment operation ends, reducing the size of the progress bar in the preset direction from the first size value to a second size value.

4. The method according to claim 3, after the reducing the size of the progress bar in the preset direction from the first size value to the second size value, further comprising:

in response to determining that a triggering operation acting on the progress bar has not been received again within a preset duration, reducing the size of the progress bar in the preset direction from the second size to a third size, wherein the triggering operation comprises the progress adjustment operation.

5. The method according to claim 1, wherein the target content comprises a video, and the adjusting the progress of the target content according to the progress adjustment operation comprises:

adjusting a playback progress of the video according to the progress adjustment operation.

6. The method according to claim 1, wherein the progress adjustment operation is received within a preset response area corresponding to the progress bar.

7. The method according to claim 6, wherein the target content is presented in a content playback page configured to provide a parent view and a plurality of child views, wherein each of the plurality of child views is associated with a response area corresponding to a control in the content playback page, wherein the plurality of child views comprise a first child view corresponding to the progress bar of the target content, and wherein the receiving the progress adjustment operation performed by a user on the progress bar of the target content comprises:

in response to sequentially receiving a Down event and a Move event within the preset response area, sequentially sending the Down event and the Move event to the first child view corresponding to the progress bar;

expanding the size of the progress bar in response to the Down event by the first child view and adjusting the progress of the target content in response to the Move event by the first child view;

in response to receiving an Up event corresponding to the Move event, sending the Up event to the first child view;

determining, by the first child view, the progress adjustment operation ends in response to receiving the Up event by the first child view.

8. The method according to claim 7, wherein the plurality of child views further comprise a second child view associated with a target response area corresponding to another control in the content playback page, and wherein the method further comprises:

in response to sequentially receiving a Down event and an Up event determining whether the Down event and the Up event are received within an overlapping area between the preset response area corresponding to the progress bar and a target response area corresponding to the another control;

in response to determining that the Down event and the Up event are received within the overlapping area, sequentially sending the Down event and the Up event to the second child view; and responding to the Down event and the Up event by the second child view.

9. An electronic device, comprising:
one or more processors;
a memory configured to store one or more programs,
wherein the one or more programs, when executed by the one or more processors, cause the one or more processors to implement operations comprising:
receiving a progress adjustment operation performed by a user on a progress bar of the target content, wherein the progress bar comprises a slider configured to be movable along the progress bar, and wherein the progress adjustment operation comprises a sliding operation with a sliding direction parallel to a movement direction of the slider;

in response to the progress adjustment operation performed by the user, expanding a size of the progress bar to a larger value in a direction perpendicular to the movement direction of the slider;

adjusting the progress of presenting the target content according to the progress adjustment operation performed by the user; and in response to determining that the progress adjustment operation ends, stopping adjusting, according to the progress adjustment operation, the progress of the target content.

10. The electronic device according to claim 9, wherein the expanding the size of the progress bar comprises:

expanding the size of the progress bar in a preset direction to a first size value, wherein the preset direction is perpendicular to a movement direction of a slider in the progress bar.

11. The electronic device according to claim 10, wherein the one or more programs, when executed by the one or more processors, cause the one or more processors to further implement operations comprising:

in response to determining that the progress adjustment operation ends, reducing the size of the progress bar in the preset direction from the first size value to a second size value.

12. The electronic device according to claim 11, wherein the one or more programs, when executed by the one or more processors, cause the one or more processors to further implement, after the reducing the size of the progress bar in the preset direction from the first size value to the second size value, operations comprising:

in response to determining that a triggering operation acting on the progress bar has not been received again within a preset duration, reducing the size of the progress bar in the preset direction from the second size to a third size, wherein the triggering operation comprises the progress adjustment operation.

13. The electronic device according to claim 9, wherein the target content comprises a video, and the adjusting the progress of the target content according to the progress adjustment operation comprises:

adjusting a playback progress of the video according to the progress adjustment operation.

14. The electronic device according to claim 9, wherein the progress adjustment operation is received within a preset response area corresponding to the progress bar.

15. The electronic device according to claim 14, wherein the target content is presented in a content playback page configured to provide a parent view and a plurality of child views, wherein a first child view corresponds to the progress bar of the target content, and wherein the receiving the progress adjustment operation performed by a user on the progress bar of the target content comprises:

in response to sequentially receiving a Down event and a Move event within the preset response area, sequentially sending the Down event and the Move event to the first child view corresponding to the progress bar;

expanding the size of the progress bar in response to the Down event by the first child view and adjusting the progress of the target content in response to the Move event by the first child view;

in response to receiving an Up event corresponding to the Move event, sending the Up event to the first child view;

determining, by the first child view, the progress adjustment operation ends in response to receiving the Up event by the first child view.

16. The electronic device according to claim 15, wherein the plurality of child views further comprise a second child view associated with a target response area corresponding to another control in the content playback page, and wherein the one or more programs, when executed by the one or more processors, cause the one or more processors to further implement operations comprising:
   in response to sequentially receiving a Down event and an Up event, determining whether the Down event and the Up event are received within an overlapping area between the preset response area corresponding to the progress bar and a target response area corresponding to the another control;
   in response to determining that the Down event and the Up event are received within the overlapping area, sequentially sending the Down event and the Up event to the second child view; and
   responding to the Down event and the Up event by the second child view.

17. A non-transitory computer-readable storage medium having thereon stored a computer program which, when executed by a processor, implements operations comprising:
   receiving a progress adjustment operation performed by a user on a progress bar of the target content, wherein the progress bar comprises a slider configured to be movable along the progress bar, and wherein the progress adjustment operation comprises a sliding operation with a sliding direction parallel to a movement direction of the slider;
   in response to the progress adjustment operation performed by the user, expanding a size of the progress bar to a larger value in a direction perpendicular to the movement direction of the slider;
   adjusting the progress of presenting the target content according to the progress adjustment operation performed by the user; and
   in response to determining that the progress adjustment operation ends, stopping adjusting, according to the progress adjustment operation, the progress of the target content.

* * * * *